Figure 4:
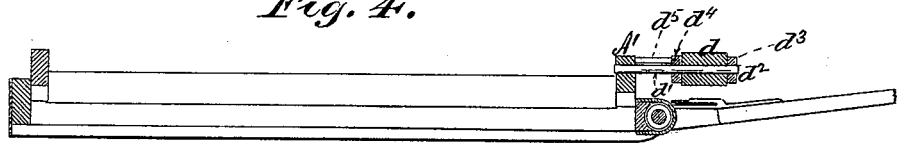

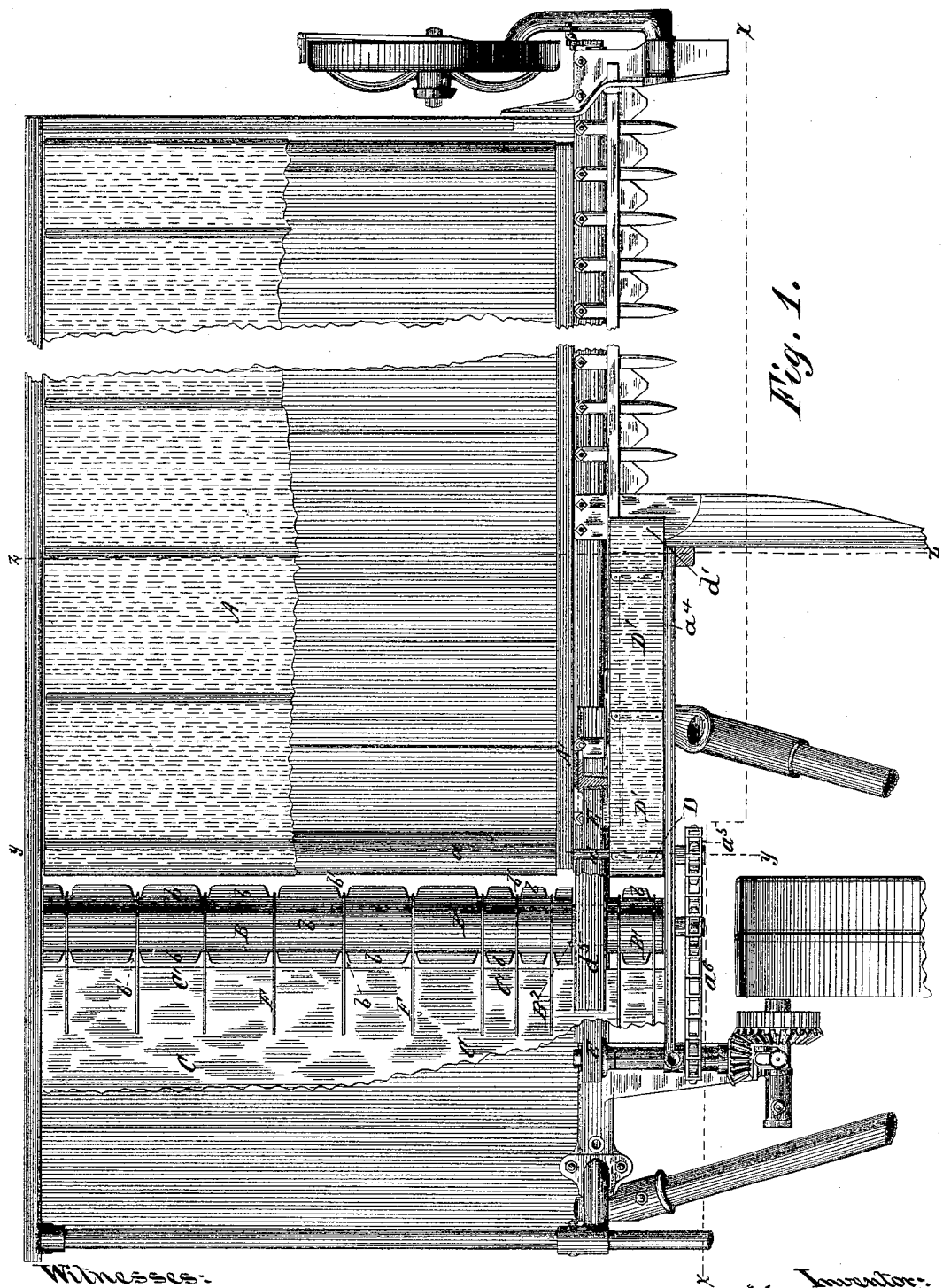

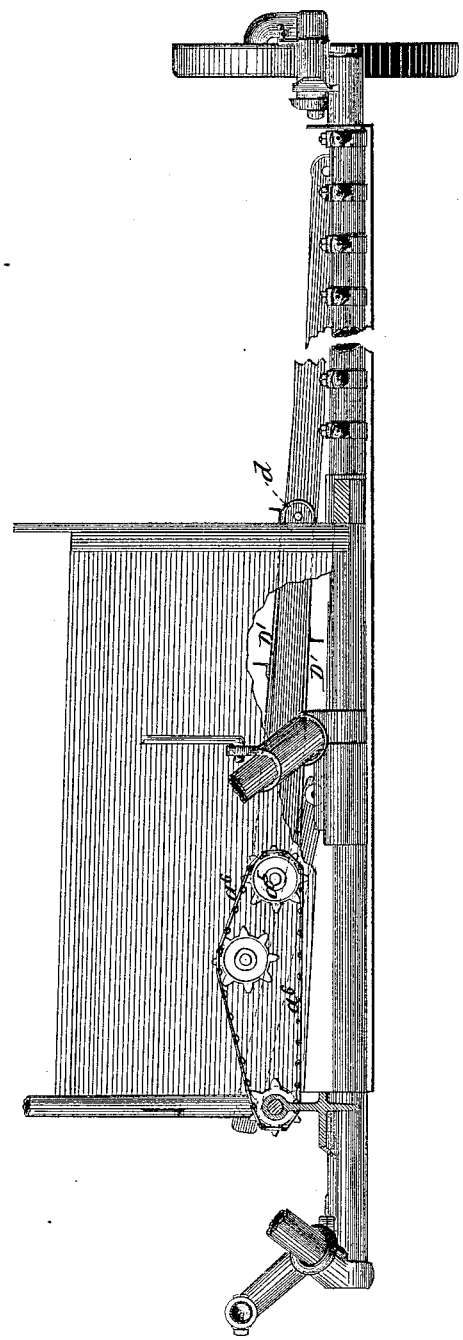

(No Model.) 3 Sheets—Sheet 3.
J. F. APPLEBY.
HARVESTER.

No. 348,259. Patented Aug. 31, 1886.

Witnesses:
R. C. Howes,
M. L. Adams.

Inventor:
John F. Appleby,
Per Edw. E. Quimby,
Atty.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

HARVESTER.

SPECIFICATION forming part of Letters Patent No. 348,259, dated August 31, 1886.

Application filed July 3, 1885. Serial No. 170,576. (No model.)

*To all whom it may concern:*

Be it known that I, JOHN F. APPLEBY, of Minneapolis, Minnesota, have invented certain Improvements in Grain-Carriers for Harvesters, of which the following is a specification.

My improvements relate to devices for conveying and delivering the cut grain from the platform to the binder in that class of low-down harvesters in which the grain and binding platforms are in a line with each other and are located in the rear of the main wheel.

In this particular construction of harvesters it is necessary that there be a space between the first guard of the cutter-bar and the binder-deck to allow a brace or support from the axle of the wheel to be secured to the front sill.

My invention consists, first, of a supplemental carrier-belt, which is comparatively narrow, and it is arranged in front of the usual platform carrier-belt, and extends from a point near the first guard toward the stubble part of the machine. As the platform carrier-belts of harvesters are arranged in the rear of the vertical plane of the finger-bar, and the sickle is in front of that plane, it follows that the butts of the cut-grain falling upon the platform overhang to a greater or less extent the front edge of the platform carrier-belt. My supplemental belt, which is provided with the usual transverse slats, serves to catch, support, and carry onward those portions of the butts of grain which extend forward from the front edge of the main carrier-belt while they are passing along the extended platform.

Another feature of my invention consists of a clearing-roller for receiving the cut grain from the platform, which clearing-roller is provided with wings projecting radially from the surface of the roller in planes parallel with its axis. These wings are notched at intervals to allow spaces for the usual stripping-fingers, which are fastened at one end to the frame beneath the clearing-roller and extend upward and over the clearing-roller and over the edge of the binder-deck. The notches in the wings are made flaring for the purpose of lessening the liability of the stalks of grain to get caught in them by jamming between the bottom of the notches and the edges of the stripping-fingers.

It is an incidental feature of the machine illustrated in the drawings that the supplemental carrier-belt is driven by a short roller mounted upon a forward extension of the shaft of the platform-belt driving-roller.

Figure 3:
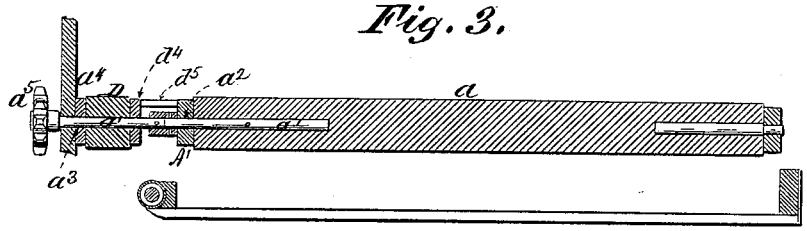

The accompanying drawings of portions of a harvester and binder containing my improvements are as follows:

Figure 1 is a top view showing the platform and a portion of the binder-deck, &c. Fig. 2 is a front elevation, partly in section, through the line $x$ $x$ on Fig. 1. Fig. 3 is a vertical section through the line $y$ $y$ on Fig. 1; and Fig. 4 is a vertical section through the line $z$ $z$ on Fig. 1.

On reference to the drawings, it will be seen that the platform-belt A is stretched in the usual way over the usual horizontal driving-roller, $a$, arranged in close proximity to a spider-cylinder or clearing-roller, B, by means of which the cut grain is taken from the platform-belt A and moved toward the binder-deck C. The shaft $a'$ of the driving-roller $a$, in addition to being provided with the usual bearing, $a^2$, in the canvas guide A', projects forward, and is provided with an additional bearing, $a^3$, in the butt-board $a^4$, and has affixed to its front end the sprocket-wheel $a^5$, for engagement by the sprocket-chain $a^6$, by means of which the driving-roller $a$ is rotated. A short roller, D, is keyed to the shaft $a'$, between the bearings $a^2$ and $a^3$. The roller D serves as the driving-roller for the supplemental belt D', which, as will be seen, is arranged in front of the platform carrier-belt A, and is stretched over the driving-roller D and over the idler-roller $d$. The shaft $d'$ of the idler-roller is provided with a bearing in the front main canvas guide, A', and with an additional bearing, $d^2$, in the grain end of the canvas guide $d^3$, secured to the butt-board $a^4$. The idler-roller $d$ is in close proximity to the first guard, and the supplemental belt is thereby sustained in position to catch the overhanging butts of the grain and assist in carrying the cut grain onward and delivering it to the clearing-roller B, by means of which the grain is moved onward toward the binder. A guide, $d^4$, for the inner edge of the supplemental belt is hung on the shafts $a'$ and $d'$, and has affixed to its upper edge a horizontal pitman-shield, $d^5$, which extends backward to the front side of the main canvas guide A', and serves to prevent the cut grain from falling on the pitman E, which operates the sickle-bar. The clearing-roller has a forward extension, B', which is in line with the supplemental belt, and the clearing-roller is provided with the circumferential groove $B^2$, to afford clearance for the pitman E. The clearing-roller is provided with series of wings, $b\,b\,b$, &c., which project radially from its periphery in planes parallel with its axis. These wings are provided with the flaring notches $b'\,b'\,b'$, &c., affording spaces for the usual stripping-fingers, F, the free ends $f$ of which project over the edge C' of the binder-deck C. The wings $b\,b\,b$, &c., perform the functions for which the teeth of an ordinary spider-cylinder are designed, but are less liable than the teeth to bend or break the stalks of grain, because of the longer bearing which each wing has upon a stalk of grain which it may have caught.

I claim as my invention—

1. In a low-down harvester and binder having a grain-platform and binder-deck in line with each other and in the same horizontal plane and a platform-carrier which extends some distance beyond the first guard, the combination, with such platform-carrier, of a supplemental carrier-belt arranged in front of the platform-belt and extending from the first guard toward the stubble side of the machine, for the purpose of catching and supporting the butts of the grain overhanging the front edge of the platform-belt and assisting the platform-belt in carrying the cut grain forward for delivery to the binding mechanism, and a shield interposed between the said main and supplemental belts for the purpose of protecting and housing the pitman which drives the cutter-bar.

2. In a low-down binder, the combination, with the platform-belt, which extends in a horizontal plane some distance beyond the inside divider, and a supplemental carrier-belt arranged as described, a separate clearing and feeding roller, the front portion of which extends forward beyond the vertical plane of the cutter-bar, so as to be substantially in alignment with the path of motion of the supplemental carrier-belt.

JOHN F. APPLEBY.

Witnesses:
M. L. ADAMS,
R. C. HOWES.